United States Patent [19]

Daugherty et al.

[11] Patent Number: 4,738,725

[45] Date of Patent: Apr. 19, 1988

[54] INITIALLY ERASABLE BALL PEN INK

[75] Inventors: Phillip M. Daugherty, Monrovia; Robert R. Massey, Pasadena, both of Calif.

[73] Assignee: Scripto-Tokai, Inc., Rancho Cucamonga, Calif.

[21] Appl. No.: 41,651

[22] Filed: Apr. 21, 1987

Related U.S. Application Data

[63] Continuation of Ser. No. 681,615, Dec. 14, 1984, abandoned.

[51] Int. Cl.$^4$ ............................................. C09D 11/18
[52] U.S. Cl. .................................. 106/308 M; 106/32; 523/161; 524/505
[58] Field of Search ....................... 523/161; 524/505; 106/20, 27, 32, 308 M

[56] References Cited

U.S. PATENT DOCUMENTS

| | | | |
|---|---|---|---|
| 3,875,105 | 4/1975 | Daugherty et al. | 524/543 |
| 4,097,290 | 6/1978 | Muller et al. | 524/571 |
| 4,329,262 | 5/1982 | Muller | 524/526 |
| 4,329,264 | 5/1982 | Muller | 524/491 |
| 4,390,646 | 6/1983 | Ferguson | 523/161 |

*Primary Examiner*—Amelia Yarbrough
*Attorney, Agent, or Firm*—Newton, Hopkins & Ormsby

[57] ABSTRACT

A ball pen ink of transiently erasable type to be dispensed from a pressurized ball pen incorporates an elastommeric polymer, pigment and a mixed solvent system. The mixed solvent system includes a volatile solvent component, a non-volatile solvent component and a non-volatile solvent/plasticizer component in such relative amounts and with relation to the elastomer and pigment combination as achieves a balance between ink viscosity and thixotropy to provide good writing qualities.

5 Claims, No Drawings

INITIALLY ERASABLE BALL PEN INK

This is a continuation of co-pending application Ser. No. 681,615 filed on Dec. 14, 1984 now abandoned.

BACKGROUND OF THE INVENTION

1. Field of the Invention

The invention is directed to an improved ink composition for ball pens, the ink being of the type whcih produces a mark on a writing surface of initially erasable character by means of an ordinary pencil eraser but which becomes permanent after a period of time of a few hours. Inks of this type are well known as are illustrated, for example, by Daugherty et al. U.S. Pat. No. 3,875,105; Muller et al. U.S. Pat. No. 4,097,290; Muller U.S. Pat. Nos. 4,329,262 and 4,329,264; and Ferguson U.S. Pat. No. 4,390,646.

2. Description of the Prior Art

The prior art suggests various elastomers in a mixed solvent system together with colorant to form a pressurized pen ink composition. The Ferguson '646 patent suggests the use of block copolymers having butadiene or isoprene midblocks which may replace the use of natural rubber as in the Daugherty et al. '105 patent to eliminate the necessity for milling the rubber. The Muller '264 patent suggests the use of a solvent system containing little or no volatile component. The Muller et al. '290 patent suggests the use of a mixed solvent system emphasizing low boiling and high boiling components. The Muller '262 patent suggests the use of a mixed solvent system comprising a volatile component and an essentially non-volatile component having a low viscosity and the optional additon of non-volatile, high viscosity material.

BRIEF SUMMARY OF THE INVENTION

To be successful, ink compositions of the type contemplated must possess the requisite rheological properties to enable them to be dispensed from a ball pen with ease of starting and smoothness in writing so as to lay down an intense line or mark which has the initially erasable character noted above. Additionally, such inks must have the requisite viscosity characteristic to flow evenly and smoothly but these inks particularly must possess the requisite thixotropy to prevent oozing when the pen is not in use, especially as they normally are dispensed under positive pressure. Thus, the ink should possess a sufficiently high viscosity within the pen reservoir as resists flow under the pressure feed conditions, but must also be sufficiently thixotropic that when the ink is subjected to the high shearing force produced by the rotating ball, the apparent viscosity is significantly lowered to a value which allows easy starting and a smooth, even flow of the ink onto the writing surface.

In order to impart the requisite balance between viscosity and thixotropic properties to the ink composition, it has been discovered that the solvent system in the colorant/elastomer/solvent composition must consisit of a three component mixed solvent system characterized essentially by a highly volatile solvent component, a substantially non-volatile solvent component having a low viscosity of only a few centipoises and a substantially non-volatile solvent/plasticizer component having a high viscosity typically of 50 or more centipoises. It has been discovered that where the components of the mixed solvent system are present in a narrow range of relative amounts and within definite ranges relative to the colorant and elastomer, the requisite balanced combination of viscosity and thixotropy is imparted thereto.

DETAILED DESCRIPTION OF THE INVENTION

The following table represents certain principles of this invention with reference to the six Examples set forth below. In Table 1, the parts are by weight and the ratios given are w/w. The compositions of Example 1 and 4 represent thixotropic inks which have a low shear rate viscosity of about 500,000 cps whereas the compositions of Example 4 and 5 have low shear rate viscosity of about $2.5 \times 10^6$ cps. The preferred Examples 2 and 3 have a low shear rate viscosity of about 200,000–250,000 cps.

TABLE I

|  | Ex. 1 | Ex. 2 | Ex. 3 | Ex. 4 | Ex. 5 | Ex. 6 |
|---|---|---|---|---|---|---|
| Elastomer | 24 | 20 | 19 | 31.8 | 18 | 19.6 |
| Pigment | 18.4 | 19.13 | 17.66 | 16.7 | 20.2 | 22 |
| Volatile solvent | 17 | 27 | 25 | 20.9 | 35 | 29.3 |
| Non-volatile solvent | 19.7 | 23.15 | 26.41 | 17.1 | 9.7 | 10.5 |
| Non-volatile solvent/plasticizer | 16.2 | 4.67 | 5.0 | 10.6 | 12.8 | 13.9 |
| Total solvent system | 52.9 | 54.82 | 56.41 | 48.6 | 57.5 | 53.7 |
| Solvent system: elastomer + pigment | 1.25 | 1.40 | 1.54 | 1.0 | 1.5 | 1.29 |
| Elastomer:pigment | 1.30 | 1.05 | 1.08 | 1.90 | .89 | .890 |
| Non-volatiles: volatile | 2.11 | 1.03 | 1.26 | 1.33 | .64 | .83 |
| Non-volatile solvent: solvent/plasticizer | 1.2 | 4.95 | 5.28 | 1.6 | 1.3 | .76 |

With respect to the preferred lower viscosity Examples 2 and 3, the weight ratio of elastomeric polymer to pigment is approximately 1; the weight ratio of the non-volatiles to volatile solvent is approximately 1–1.26; and the weight ratio of the solvent system to the elastomeric polymer plus pigment is approximately 1.40–1.54. In addition, it is important that the weight ratio of the non-volatile solvent/plasticizer component is about 5. These values as well as the ranges thereof illustrated in Table 1 result in ink compositions having balanced viscosity and thixotropy essential to good writing qualities when the inks are dispensed from a pressurized ball pen.

EXAMPLE 1

| Elastomeric polymer | Kraton 1107 | 24 |
|---|---|---|
| Colorant | Alkali Blue (Red Shade) | 2.88 |
|  | Alkali Blue (Green Shade) | 2.88 |
|  | Phthalo Blue (Green Shade) | .64 |
|  | Victoria Blue | 12 |
| Volatile solvent component | Laquer Diluent #6 | 17 |
| Non-volatile solvent component | Penreco 2257 oil (viscosity 1.5 cps) | 19.7 |
| Non-volatile solvent/ plasticizer component | D-15 mineral oil (viscosity 50 cps) | 9.6 |
|  | DOP (viscosity 58 cps) | 6.6 |
| Lubricants | Oleic acid | 1.7 |
|  | Lauric acid | 1.5 |
|  | Stearic acid | 1.5 |
|  |  | 100 |

In addition to the elastomer/pigment/solvent system described above, lubricant in amount of 4.7 parts by weight is included. The Kraton 1107 is a block copolymer available from Shell Oil Company, Houston, Tex., and is referenced in the Ferguson U.S. Pat. No. 4,390,646 incorporated by reference herein. The Alkali Blue pigments are available from Sherwin-Williams Co., Cleveland, Ohio and the Victoria Blue from E. I. Dupont, Wilmington Del. and are referenced in the Muller '262 patent which is incorporated herein by reference. Laquer Diluent 6 is available from Chem Central Company, Chicago, Ill., is an aliphatic petroleum distillate having a boiling range of 94°–120° C. and is identified in the Muller et al. '290 patent, incorporated by reference, and in the Muller '262 patent.

The Penreco 2257 oil and the D-15 mineral oil are identified in the Muller '262 patent, DOP is dioctyl phthalate and the fatty acids are conventional lubricants for ball pen inks.

EXAMPLE 2

| Elastomeric polymer | Kraton D-1107 | 20 |
| --- | --- | --- |
| Colorant | Blue Pigments | 19.13 |
| Volatile solvent component | Cyclo hexane | 23.2 |
| | Ethyl acetate | 3.8 |
| Non-volatile solvent component | TX1B (viscosity 2 cps) | 8.0 |
| | Light mineral oil (viscosity 2 cps) | 15.15 |
| Non-volatile solvent/ plasticizer component | DOP | 4.67 |
| Lubricants | Oleic acid | 1.0 |
| | Lauric acid | 1.5 |
| | Stearic acid | 1.5 |
| Other | Polyvis 30-SH | 1.23 |
| | Sarcosyl - 0 | .82 |
| | | 100 |

KODAFLEX (TX1B) is marketed by Eastman Kodak Company, Kingsport, Tenn. and is identified in the Muller '262 patent. Example 2 is a commercial formulation and, as is usual with the inks of this invention, the pigment is milled into a paste which contains the DOP and some light mineral oil. The Polyvis 30-SH is a low molecular weight polymer which is added to the pigment paste mill for lubrication purposes and the Sarbosyl-0 is oleoyl sarcosine, a wettability agent as identified in the Daugherty et al. '105 patent.

EXAMPLE 3

| Polymer | Kraton D-1107 | 19.0 |
| --- | --- | --- |
| Colorant | Black Pigments | 17.66 |
| Volatile solvent component | Cyclo hexane | 21.5 |
| | Ethyl acetate | 3.5 |
| Non-volatile solvent component | TX1B (viscosity 2 cps) | 8.0 |
| | Light mineral oil (viscosity 2 cps) | 18.41 |
| Non-volatile solvent/ plasticizer component | DOP | 5.0 |
| Lubricants | Oleic acid | 1.5 |
| | Lauric acid | 1.5 |
| | Stearic acid | 1.17 |
| Other | Polyvis 30-SH | 1.96 |
| | Sarcosyl - 0 | .8 |
| | | 100 |

Example 3 is also a commercial ink. Both the inks in Example 2 and 3 have low shear viscosity of 200,000–250,000 cps.

EXAMPLE 4

| Elastomeric polymer | Oppanol B-15 | 22.3 |
| --- | --- | --- |
| | Oppanol B-50 | 9.5 |
| Colorant | Blue Pigments | 16.7 |
| Volatile solvent component | Laquer Diluent #6 | 20.9 |
| Non-volatile solvent component | Penreco 2257 oil (viscosity 1.5 cps) | 17.1 |
| Non-volatile solvent/ plasticizer component | D-15 mineral oil | 8.8 |
| | Polybutene | 1.8 |
| Lubricants | Oleic acid | 1.1 |
| | Lauric acid | .9 |
| | Stearic acid | .9 |
| | | 100 |

Oppanol is an elastomeric polyisobutylene polymer available from BASF of Norwalk, Calif.

EXAMPLE 5

| Elastomeric polymer | Epcar 346 | 18.0 |
| --- | --- | --- |
| Colorant | Blue Pigments | 20.2 |
| Volatile solvent component | Laquer Diluent #6 | 35.0 |
| Non-volatile solvent component | Penreco 2257 oil | 9.7 |
| Non-volatile solvent/ plasticizer component | D-15 mineral oil | 10.6 |
| | Polybutene | 2.2 |
| Lubricants | Oleic acid | 4.3 |
| | | 100 |

Epcar 306 is a copolymer of ethylene and propylene and Epcar 346 is a terpolymer of ethylene, propylene and an unconjugated diene available from B. F. Goodrich.

EXAMPLE 6

| Elastomeric polymer | Epcar 306 | 19.6 |
| --- | --- | --- |
| Colorant | Blue Pigments | 22.0 |
| Volatile solvent component | Laquer Diluent #6 | 29.3 |
| Non-volatile solvent component | Penreco 2257 oil | 10.5 |
| Non-volatile solvent/ plasticizer component | D-15 Mineral Oil | 11.5 |
| | Polybutene | 2.4 |
| Lubricants | Oleic acid | 4.7 |
| | | 100 |

As will be seen from the above, various elastomeric polymers may be used, their selection depending upon choice of molecular weight within that range of Mooney viscosity to which rubber would be milled to formulate an ink based thereon. Other and different elastomeric polymers may be used such as the Solprenes which are no longer available commercially and thus have not been included herein.

What is claimed is:

1. In a pressurized ball pen having a pressurized reservoir and a ball for transferring ink from the reservoir onto a writing surface, an ink composition capable of depositing a trace on a paper-like writing surface in which the trace is initially erasable but develops permanence with time, said ink composition comprising
an elastomeric polymer, a solvent system for the elastomeric polymer, and pigment,
said elastomeric polymer being selected from the group consisting of thermoplastic block copolymers having an array of thermoplastic and rubbery blocks in which said thermoplastic blocks are selected from the class consisting of styrene and urethane blocks and said rubbery blocks are selected from the class consisting of butadiene, isoprene and ethylene-butylene blocks, polyisobutylene polymers, copolymers of ethylene and propylene, and terpolymers of ethylene, propylene and an unconjugated diene, said solvent system consisting essentially of a volatile hydrocarbon component having a boiling point at atmospheric pressure which is less than about 180° C. and acts as a solvent for said elastomeric polymer, a low viscosity, non-volatile oil component which has a boiling point at atmospheric pressure greater than about 180° C. and less than about 300° C. and also acts as a solvent for said elastomeric polymer and having a viscosity of a few centipoises, and a non-volatile organic plasticizer component having a boiling point at atmospheric pressure of more than about 300° C. and which acts as a solvent/plasticizer for said elastomeric polymer and has a viscosity substantially greater than that of said low viscosity, non-volatile oil component, the weight ratio of the non-volatile components to the volatile component being in the range of about 0.5–2.2 and the weight ratio of the solvent system to the sum of the elastomeric polymer and pigment being in the range of about 1–2.0 to provide a thixotropic ink having a low shear rate viscosity of about 200,000–2.5×$10^6$ centipoises within the pen reservoir to resist flow past the ball under the pressure feed conditions in such reservoir and sufficiently low apparent viscosity when the ink is subjected to the high shearing force produced by the rotating ball to allow easy starting and a smooth, even flow of the ink onto the writing surface.

2. In a pressurized ball pen as defined in claim 1 wherein the viscosity of said oil component is not more than about 2 centipoises and the viscosity of said solvent/plasticizer component is in the range of about 50–60 centipoises.

3. In a pressurized ball pen as defined in claim 2 wherein the weight ratio of the non-volatile components to the volatile components is about 1.03–1.26, the weight ratio of low viscosity non-volatile component to solvent/plasticizer component is about 5, and the weight ratio of the solvent system to the sum of the elastomeric polymer and pigment is about 1.40–1.54 to yield a low shear rate viscosity of 200–250×$10^3$ centipoises.

4. In a pressurized ball pen having a pressurized reservoir and a ball for transferring ink from the reservoir onto a writing surface, an ink composition consisting essentially of:

a thermoplastic block copolymer having an array of thermoplastic and rubbery blocks in which said thermoplastic blocks are selected from the class consisting of styrene and urethane blocks;

said rubbery blocks being selected from the class consisting of butadiene, isoprene, and ethylene-butylene blocks;

the ratio of said rubbery blocks to said thermoplastic blocks being from 60:40 to 90:10;

a solvent system for the copolymer;

pigment; and a minor amount of lubricant;

said solvent system consisting essentially of a hydrocarbon volatile component having a boiling point at atmospheric pressure of less than about 180° C., a low viscosity non-volatile oil component having a boiling point at atmospheric pressure greater than about 180° C. and less than about 300° C. and a viscosity of not more than a few centipoises, and a non-volatile/plasticizer component having a boiling point at atmospheric pressure of more than about 300° C. and a viscosity substantially greater than said few centipoises;

the weight ratio of said low viscosity non-volatile component to said non-volatile/plasticizer component being within the range of about 0.76–5.28, the weight ratio of non-volatile to volatile components being in the range of about 0.5–2.2, the weight ratio of said copolymer to said pigment being in the range of about 0.75–1.3, said copolymer consisting of about 18–24% by weight of the final ink composition and the solvent system consisting of at least 50% by weight of the total ink composition to provide a thixotropic ink having a low shear rate viscosity of about 200,000 to about 250,000 centipoises within the pen reservoir to resist flow past the ball under the pressure feed conditions in such reservoir and a sufficiently low apparent viscosity when the ink is subjected to the high shearing force produced by the rotating ball to allow easy starting and a smooth, even flow of the ink onto the writing surface.

5. In a pressurized ball pen as defined in claim 4 wherein the viscosity of said oil component is not more than about 2 centipoises and the viscosity of said solvent/plasticizer component is in the range of about 50–60 centipoises.

* * * * *